W. L. GOODSTEIN
BUFFING DEVICE
July 9, 1929
Re. 17,366
Original Filed July 31, 1926
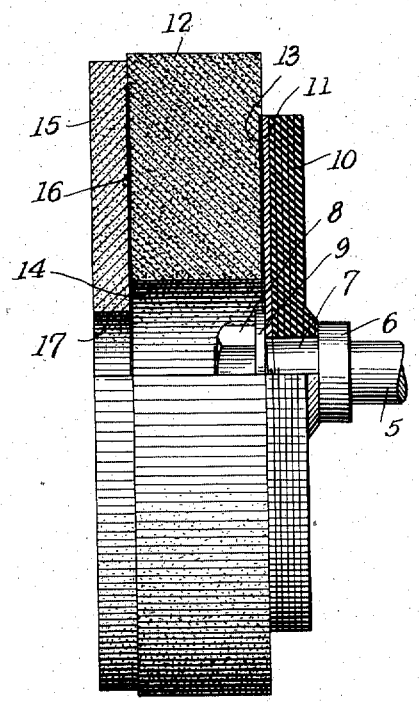
INVENTOR.
W. L. Goodstein
BY J. M. Wilson
ATTORNEY Reissued July 9, 1929. Re. 17,366

UNITED STATES PATENT OFFICE.

WILLIAM L. GOODSTEIN, OF NEW YORK, N. Y.

BUFFING DEVICE.

Original No. 1,645,047, dated October 11, 1927, Serial No. 126,109, filed July 31, 1926. Application for reissue filed March 16, 1929. Serial No. 347,710.

This invention relates to polishing or buffing devices and more particularly to those of the highest grade, adapted for manipulation on flat surfaces as directed and controlled by an operator, with special reference to the bodies of vehicles.

It is a matter of common knowledge that the constantly increasing number of automobiles and like pleasure vehicles has created a demand for means adapted to put a high polish on the painted or lacquered body and wheels of such vehicles and also facilitating cleaning the same from accumulations of dust, mud and the like, such cleansing operations being onerous and extremely tedious, beside involving the expenditure of valuable time and the exercise of great care to avoid scratching or otherwise marring the initial finely finished surface in removing undesirable accretions. With this device a vehicle of any size can be cleaned and polished in a small fraction of the time required for the manual performance of the same work.

Not only is there great danger of abrading the surface but also of causing discolorations due to heat engendered by friction of the polishing means employed.

The cellulose or pyroxylin lacquer finishes now almost universally used on automobile bodies are particularly susceptible to becoming discolored and blistered by the heat engendered by the friction of polishing pads, so much so, in fact, that in spite of the exercise of the greatest care the polishing of this type of finish with the pads heretofore known often results in discoloration or blistering of the finish by the frictional heat engendered by the rubbing of the pad on the surface, and has precluded the employment of power rotation for these pads on such finishes, due to the damaging frictional heating caused by the speed at which power driven pads are operated.

Polishing pads for high, glossy finishes of oil paint or pyroxylin lacquer have necessarily been made of material, such as wool felt or lamb's wool, which will not scratch or wear into the finish. However, such material has a serious defect when used to polish pyroxylin lacquer finishes in that the materials used for polishing are very poor conductors of heat and therefore quickly engender and hold sufficient frictional heat in use to cause discoloration or blistering of the pyroxylin finish.

It is therefore an object of this invention to provide a polishing device so arranged as to be substantially incapable of defacing the surface on which it is operated by scratching, no rough or hard portions of the buff projecting to contact with the work surface.

A further feature is in the provision of means adapted to absorb any heat generated by frictional contact and dissipate the same in the atmosphere.

As is obvious this device can also be used to great advantage as a mechanical sander on painted or lacquered surfaces between the application of successive coats and with any suitable abrasive either in paste or liquid form.

Another advantage resides in the interposition between the buffing element and its backing of a soft resilient cushion adapted to evenly distribute the pressure applied in a uniform even manner.

These and other practical and valuable features, which will become obvious as the description progresses, are accomplished by the novel selection, construction and arrangement of parts as hereinafter described and shown in the accompanying drawing, forming a material part of this disclosure and in which the figure is a partial side elevational, partial transverse sectional view of a buffing head made in accordance with the invention.

In the drawing the numeral 5 designates the front portion of an arbor or drive spindle, the same being actuated in any convenient manner from a power unit, as a flexible shaft or the like, not shown, and provided with a handle, also omitted, by which the implement may be efficiently manœuvred.

Fixed on the spindle 5 is a collar 6, the inner extending end 7 of the spindle being screw-threaded and provided with a nut 8 and washer 9.

The arbor 7 passes through an axial opening in a circular flexible backing plate 10 which may be metal but preferably in a series of rubber plates interposed with layers of canvas or like reenforcing material to provide a suitable degree of stiffness.

Adjacent the backing plate 10 is a flexible press board or fiber disc 11, the disc and plate being clamped against the collar 6 by the nut 8 to be driven by the arbor.

A circular pad 12 of considerable thickness and of larger diameter than the backing 10 is secured to the disc 11 by a mutually adherent film of glue 13 or like adhesive, this pad being composed of heat absorbent felt, soft, spongy and elastic, constituting a cushion and having an opening 14 into which the nut 8 extends, the opening being of sufficient size to permit the entrance of a wrench in securing the head upon the arbor.

A disc 15, substantially one third the thickness of the pad 12, of pure soft wool felt is secured to the face of pad 12 by a film of adhesive 16, so applied between these pads as to avoid projecting to the periphery of the wool pad 15 which, as shown, is of slightly smaller diameter than the cushion pad 12 and held firmly concentric upon its face; the outer pad 15 is provided with a relatively small central opening 17 to admit a wrench into the chamber 14 in adjusting the head upon its arbor.

In operation the face of the pad 15 is applied to the work surface, previously relieved of any collection of caked mud, and such pressure applied by an operator as discretion and experience indicate.

The rapidly revolving soft face of the pad immediately produces a high glossy polish, reducing the usual time for such work very materially and obviously scratching is impossible as any hard substance, even the glue, is prevented from coming in contact with the work, while the arbor and its parts are entirely enclosed, and any heat generated is absorbed or carried off by the felt.

From the foregoing it will be seen that a simple device for this purpose has been disclosed in the preferred form of its embodiment, but it is not desired to restrict the details to the exact construction shown, it being obvious that changes, not involving the exercise of invention may be made without conflicting with the scope of the appended claims.

Having thus described my invention what I claim as new and desire to secure by Letters Patent, is:—

1. A polishing head comprising a soft woolen polishing pad and a cushion pad of heat absorbent felt disposed against the back of said polishing pad, said polishing pad being of softer texture than the cushion pad.

2. A polishing head comprising a soft woolen polishing pad, a harder cushion pad of heat absorbent felt fixed to the back thereof, and a flexible fiber plate fixed on the back of the cushion pad.

3. A polishing head comprising a soft wool felt disc, a cushion pad of heat-absorbent felt fixed to the back of said disc, a fiber disc fixed on the back of said pad, a laminated backing for such fiber disc, and means to convey rotary motion to said head.

4. A polishing head comprising a power driven arbor, a yielding backing plate secured on said arbor, said plate comprising rubber and canvas sheets arranged in alternate relation, a cushion pad fixed on the face of said plate, said pad having an opening into which said arbor extends, and a facing disc of softer texture than said cushion pad fixed on the outer side of said pad, said disc containing an opening through which said arbor is accessible.

In testimony whereof I have hereunto affixed my signature.

WILLIAM L. GOODSTEIN.